Patented Sept. 19, 1950

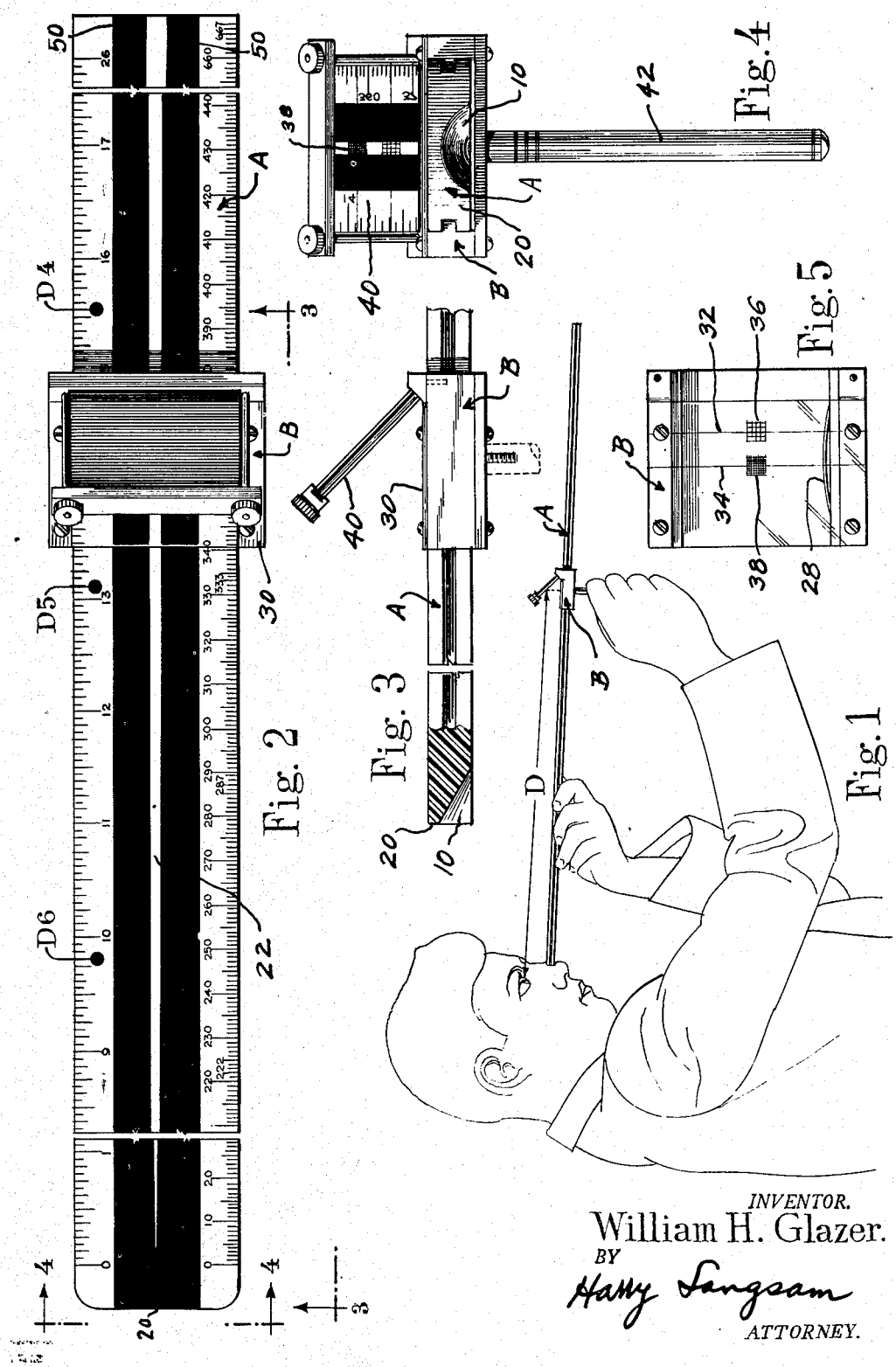

2,523,007

UNITED STATES PATENT OFFICE 2,523,007

OCULAR DIAGNOSTIC INSTRUMENT HAVING VISUAL TARGET MEANS

William H. Glazer, Philadelphia, Pa.

Application August 1, 1947, Serial No. 765,473

1 Claim. (Cl. 88—20)

My invention relates to diagnostic instruments for use by optometrists, and relates particularly to an instrument for measuring the maximum focusing ability, the power of accommodation, the visual acuity at various finite distances, and for observing the functioning of the extra-ocular muscles.

Hitherto, to determine the subject's focusing ability, it has been customary to advance printed matter toward or away from the subject, so that the maximum and minimum distances at which the printed matter is legible can be discovered. The method is liable to error, for several reasons. First, the size of the type must be on a proper scale with the reduced distance at which this test is made, as compared with the standard distance of twenty feet of the Snellen chart test. Secondly, the clarity, or "readability" of the many kinds of type varies considerably even if they are all of the same size. Thirdly, and most important, the subject is usually able to recognize printed words which are beyond his focus, because of the context of the material in which these words appear, or because the outlines of the words have become familiar through long association. Hence, an examination of this type gives the practitioner a false idea of his subject's visual power, and lenses prescribed on the basis of the results may be unsuitable and/or harmful.

Visual acuity has been defined as the ability of the eye to see an object that subtends an angle of five minutes of arc and whose formative parts subtend one minute of arc. Thus, the normal eye sees at twenty feet an object whose linear height is 0.03 foot, or slightly more than a quarter of an inch. The distance of twenty feet is the accepted average normal for what is termed practical infinity. An eye which can only see at the same distance an object which is twice the size of that calculated for the normal is said to have an acuity of 0.5. Scientifically, this is open to several objections, but practically this scaling has given a satisfactory basis for comparison of average seeing power.

In addition to visual acuity, the optometrist is interested in obtaining the subject's power of accommodation. Accommodation is the ability of the eye to change focus, as when the eye is turned from a distant object to a near object. Even the normal eye loses this ability as the subject ages. When this condition, known as presbyopia or old-age sight, is present, it is necessary to supplement the focusing of the eye with external correction in the form of glasses. Since the range over which the eye accommodates is limited, it is sometimes necessary to provide several corrections, in the form of bifocals or trifocals, so that the subject can clearly see objects at close, medium and far distances.

The range of accommodation of the eye is the distance between the nearest point at which an object may be clearly seen, and the farthest point at which an object may be clearly seen. When these point distances are expressed in meters, their reciprocals are known as the diopter distances. The maximum focusing ability of the eye is usually expressed as the diopter value of the near point. An important quantity used by optometrists in prescribing corrective lenses is the amplitude of accommodation. The amplitude is given as the diopter difference of the near point and the far point. For the optometrist, this information is the safest guide for determining if and when bifocals are required, either in dealing with presbyopia (old age sight) or with the effects of some disease which limits the action of the ciliary nerves and muscles that control the act of focusing for some necessary finite distance.

For example, a person sixty years of age or his ocular age equivalent, having an amplitude of accommodation of only one diopter will require a bifocal of at least two diopters in power if he is to see an object at sixteen inches and have a reserve of one-third the working requirement. With this optical aid, the person can perceive an object at thirteen inches by exhausting his entire amplitude, but prolonged vision at this distance would result in severe strain. Also, should the person be required to see an object at twenty inches his amplitude is insufficient when looking through the distance portion of his lenses. Hence in this case, it would be very desirable to use trifocals.

More frequently than is commonly known, the amplitude of accommodation is different for each eye. If the difference between the eyes is large there is good reason to suspect cerebral decay in the motor area of the brain, and the possible occurrence of a stroke can be anticipated. However, even if the discrepancy is not large, the information may be used by the optometrist to prescribe different bifocal powers for each eye. This practice, which contributes to the patient's comfort is not often resorted to at the present time, for lack of suitable and accurate means.

Ordinary visual acuity reports imply that the tests are made at practical infinity, i. e., twenty feet, without any act of accommodation. This is a static test, and gives little information about acuities under dynamic performance. Factually the correction glasses for finite distances may be shown to have a power different from the declared power of the test lenses, or the acuity at finite distances may be more or less than the distance tests disclose. Since acuity ratings for finite distances may differ from those obtained with the chart at practical infinity, precise information for finite distances in subdivisions of the inch and the meter are very useful.

It is desirable to observe the binocular muscle functioning of the eyes particularly in respect to vertical inequalities at finite distances, and in different planes.

It, therefore, is an object of my invention to provide an instrument for accurately measuring in one or both eyes, the range of accommodation, the maximum focusing ability, and the visual acuity at finite distances.

Another object of my invention is to provide an optometric instrument for dynamically checking the functioning of a particular bifocal correction over the various distances the correction is to be used.

Another object of my invention is to provide an instrument for determining the power of bifocal necessary for each eye.

Another object of my invention is to provide an instrument which tests for vertical inequalities in the muscle functioning of the two eyes, for horizontal over- and under-convergence, and to obtain the necessary prismatic correction therefor.

Still another object of my invention is to provide an instrument which may be used by the patient for corrective exercises.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing in which:

Fig. 1 is a side view of my invention showing the manner of its handling.

Fig. 2 is a fragmentary top view of my invention.

Fig. 3 is a fragmentary, partly sectional view of my invention looking along the lines 3—3 of Fig. 2.

Fig. 4 is an end view of my invention, taken along the lines 4—4 of Fig. 2. The reflection of the scale face in the mirror is also shown.

Fig. 5 is a top view of the slider used with my invention, the mirror having been removed to permit the direct viewing of the slider grids.

Referring now to the drawing, wherein similar reference characters designate similar parts, I show an instrument for obtaining the previously described measurements, and consisting of a flat rule, approximately 26 inches in length which is generally designated as A, and a cursor adapted to slide along the rule, and generally designated as B. One end 20 of the rule has its underside 10 gouged out to facilitate the supporting of the rule upon the nose, as shown in Fig. 1, and the sides of the rule are recessed along their entire length to provide guide-ways for the slider B. The two edges of the top surface of the rule are calibrated in the English and metric scales respectively, the scale numbers increasing with their distance from the nose end. A white angular area 22 of twenty minutes is laid out centrally along the length of the rule, with the sides of the angular area diverging from the nose end 20. The area 50 on either side of the white angle is blackened for contrast and to eliminate excess portions of the grid images.

Auxiliary markings such as D4, D5, and D6 may be laid off upon the rule, and correspond to the diopter value of the particular distance on the rule. The dioptral scale being the reciprocal of the linear distance in meters, the point D6 located at approximately 10 inches represents 4 diopters, the point D5 near 13 inches represents 3 diopters, and the point D4 near 16 inches represents 2.5 diopters. The diopter scale should preferably be calibrated for intervals of one-quarter diopter.

The slider B has a bottom plate and side walls, and which are adapted to slide along the bottom and side surfaces of the rule respectively. A spring 28 is secured to one side wall so that the slider may move without play. The top plate 30 of the slider is made of a clear substance such as glass or plastic, and is provided with a pair of hairlines 32 and 34 with grids 36 and 38 etched respectively thereon. Grid 36 has a line spacing of one millimeter; grid 38 has a line spacing of one-half millimeter. A mirror 40 is mounted upon the slider at an angle of 45 degrees, so that an image of the grids, their respective hairlines, and the portion of the scale underneath the top plate of the slider are visible from the nose end of the rule. A handle 42 is attached to the bottom plate of the slider so that the slider may be conveniently moved to any point along the rule. The employment of the instrument, and the interpretation of the readings obtained therewith are as follows:

The rule being only 26 inches long, the object being viewed by the patient is on a reduced scale. The large grid 36 which has a spacing of one millimeter should be clearly seen by the normal eye at a distance of 26 inches, since the large grid represents in size the Snellen equivalent of 5 minutes of arc at this distance. Similarly the smaller grid 38 having a spacing of one-half millimeter is the Snellen equivalent of five minutes of arc for a distance of 13 inches, and should be clearly seen by the normal eye at this distance. The image of the grids is reflected by the slanted mirror 40 back to the patient. The grids appear to be superimposed upon the white central angle 22, and the edges of the grids blend with the black border on either side as the slider advances toward the patient. The white angle of 20 minutes gives a sufficiently broad field for observation of the visible portions of the grid. The line thickness of the grids is suitable for practically determining the acuity.

The grid images are assumed to be clearly seen when the vertical and horizontal line formation is seen to form complete squares without discontinuity. Frequently, at the resolving power of the eye, the vertical lines only are seen, the horizontal lines having faded through astigmatic error. For the same reason, the reverse may occur, or the lines may be reported to be slanting or irregular, alerting the examiner to the existence of the condition.

*Measurement*

If the patient's acuity is known to be subnormal, his attention is directed to the large grid image in the mirror. If the patient's acuity approaches normal, his attention is directed to the small grid appearing in the mirror.

The instrument is placed upon the patient's upper lip, and the slider is advanced toward him until the particular grid square are not longer seen as such. This distance, as indicated by the diopter scale marking closest to the hairline of the particular grid is then noted. The slider is now placed at a point well within this distance, and is moved outwardly until the particular grid reappears.

This distance, which should be approximately the same as the first, is also noted. If the discrepancy is large, the readings should be taken a second time as a check. The diopter value of this near point represents the maximum focusing power of the eye. The reading should be taken for each eye, occluding the other while the test is being made. In order to establish the far point, the slider is moved away from the patient until the image fades. The normal eye should perceive the small grid clearly at a distance of 13 inches. Vision at a greater distance indicates the patient has better than normal acuity, the acuity being determined as the fraction: distance in inches over thirteen. The distance of the far point is noted, and the value is checked by moving the slider from a more distant point, at which the grid image is blurred, to the point at which the grid is again clearly visible. The diopter value of this point is noted, and the amplitude of accommodation is at once found as the difference in diopters between the near point and the far point. If the values obtained for each eye differ, the examiner has sufficient evidence that corrective lenses of different powers are necessary.

The larger grid 38 is used for the presbyope or its equivalent. Since the squares are one millimeter, they should be seen clearly by the normal eye at a distance of 26 inches, if the amplitude of accommodation is at least one and one-half diopters. If not seen clearly, the slider is advanced until the patient does perceive them clearly. The optometrist is thus informed as to the amount of correction necessary.

Once a correction has been determined, the efficiency of the correction is determined by repeating the above tests while the patient is wearing the lenses. The correction should be effective over the desired range of distances. For example, a bifocal may be necessary for a specific distance, say 13 inches, at which distance the patient is accustomed to work or read. If the optometrist knows the patient's amplitude and near point, he can provide a correction which will serve from 10 through 13 inches. However, by moving the slider away from the patient, the examiner may find that the bifocal provides only an inch of additional outward range beyond 13 inches. Clearly the examiner has evidence that a separate correction, embodied in a trifocal, is necessary for some practical intermediate range beyond 13 inches. While determining the binocular nearpoint, the examiner can observe the convergence of the eyes as the slider is moved toward the patient. Not only is the limit of convergence accurately determined, but any irregularity of convergence is easily observed, and the exact point at which the convergence breaks is determined.

Muscle tests

My invention is particularly adapted to reveal vertical inequalities in binocular vision, and also is adapted to reveal horizontal divergence or excessive convergence. For this purpose, the slider is provided with an opaque cover (not shown) so that the grids are concealed and the attention of the patient is directed to the near edge of the slider. Since each eye perceives the central white portion 22, the normal person sees a V composed of two white strips which converge to a point at the near edge of the slider. The plane of the V thus formed should appear horizontal if the instrument is held horizontally.

A patient having unequal vertical functioning of his eyes sees one side of the V displaced above the other. The amount of prism correction necessary to restore the V sides to the same elevation is taken as the measure of vertical divergence of the eyes.

To a patient whose eyes tend to converge excessively as in esophoria, the image appears as an X, that is, the white portions 22 seen by each eye appear to cross at some point ahead of the slider. If the eyes are overly divergent, the white portions seen by each eye appear not to converge at all. Again, the amount of prism required to produce convergence at the edge of the slider may be taken as the measure of horizontal convergence or divergence.

Once the V has been restored by prismatic correction the entire instrument may be moved through several planes, upwards and downwards, to check if the V image is stable. These methods of determining muscle function have repeatedly rectified errors in observation made by the subject with conventional tests.

Corrective exercises

I have found that progressive myopia, hitherto regarded as uncontrollable, may be acted upon rationally with my instrument.

Since the far point position of this type of near-sightedness is always finite, one sets the slider (grid now visible) at that point. The patient is then directed to sight upon the grid while the slider is moved outwardly, away from the patient. This is a form of controlled exercise for the purpose of causing the far point to recede. With this exercise many persons now accustomed to wearing progressively stronger corrections for near-sightedness have been able to adopt milder corrections, or at least the customary increase in power, often very rapid, has been arrested. The improvement is measured directly upon the instrument.

Again, where there is an inadequacy of convergence upon finite targets, a condition occurring more frequently than is commonly suspected, one may use the instrument in the manner described for testing for convergence. The slider is moved outwardly to its extreme limit, and as the patient fixes an image of the V, the slider is advanced toward the patient. Progressive improvement of the patient's convergence is measured directly upon the instrument.

Although my invention has been described in considerable detail, such description is intended as being illustrative rather than limiting, since the invention may be variously embodied, and the scope of the invention is to be determined as claimed.

I claim as my invention:

An optometric instrument comprising an elongate rule having near end adapted to be supported upon the nose of the observer and having a handle for horizontally supporting the far end, said rule having a distance scale graduated along the length of its top surface, a plurality of diopter markings, each diopter marking located on said rule adjacent its corresponding distance scale marking, a cursor slidably mounted on the top surface of said rule, said cursor having a transparent top, a grid of lines on said transparent top, a mirror mounted on said cursor, said mirror making an angle of 45 degrees with the top surface of said rule for reflecting an image of said grid together with an image of the subjacent portion of the scale toward the observer, a white, angular strip extending along the top of said rule, said strip having its apex at the near end of said rule, a dark border flanking both sides of said white angular strip, said strip serving as a field of variable size for illuminating said grid.

WILLIAM H. GLAZER.

REFERENCES CITED

The following references are of record in the file of this patent:

UNITED STATES PATENTS

| Number | Name | Date |
| --- | --- | --- |
| 276,732 | Trowbridge | May 1, 1883 |
| 698,833 | Hardy | Apr. 29, 1902 |
| 824,900 | Bates | July 3, 1906 |
| 1,953,268 | Scott | Apr. 3, 1934 |
| 2,003,806 | Lee | June 4, 1935 |
| 2,026,607 | Bennett | Jan. 7, 1936 |
| 2,261,850 | Kelly | Nov. 4, 1941 |
| 2,385,992 | Jobe | Oct. 2, 1945 |

OTHER REFERENCES

Zoethout—Text—on Physiological Optics, published by Professional Press, Chicago, Illinois, 1927, page 299.